United States Patent
Green (10) Patent No.: US 10,530,176 B2
(45) Date of Patent: Jan. 7, 2020

(54) TRAVEL CASE AND STAND FOR SMART WATCH

(71) Applicant: Andrew Bradford Green, Mt. Pleasant, SC (US)

(72) Inventor: Andrew Bradford Green, Mt. Pleasant, SC (US)

(*) Notice: Subject to any disclaimer, the term of this patent is extended or adjusted under 35 U.S.C. 154(b) by 0 days.

(21) Appl. No.: 15/447,204

(22) Filed: Mar. 2, 2017

(65) Prior Publication Data

US 2017/0242406 A1    Aug. 24, 2017

Related U.S. Application Data

(60) Provisional application No. 62/302,522, filed on Mar. 2, 2016, provisional application No. 62/311,437, filed on Mar. 22, 2016.

(51) Int. Cl.
| | | |
|---|---|---|
| *H02J 7/02* | (2016.01) | |
| *H02J 7/00* | (2006.01) | |
| *A47F 7/02* | (2006.01) | |
| *A47F 7/03* | (2006.01) | |
| *H02J 50/00* | (2016.01) | |

(52) U.S. Cl.
CPC ............ *H02J 7/025* (2013.01); *H02J 7/0044* (2013.01); *A47F 7/022* (2013.01); *A47F 7/03* (2013.01); *H02J 50/00* (2016.02)

(58) Field of Classification Search
CPC ................................ H02J 7/025; H02J 7/0044
See application file for complete search history.

(56) References Cited

U.S. PATENT DOCUMENTS

| | | | | |
|---|---|---|---|---|
| 4,873,677 A * | 10/1989 | Sakamoto | ............... | G04C 10/00 368/204 |
| 9,577,467 B1 * | 2/2017 | Karanikos | ............... | H02J 7/025 |
| 9,996,055 B2 * | 6/2018 | Wierenga | ............... | G04G 19/00 |
| 10,178,923 B2 * | 1/2019 | Rosenblum | ......... | F21V 23/0471 |
| 2008/0090622 A1 * | 4/2008 | Kim | ....................... | H02J 7/0044 455/573 |
| 2013/0023148 A1 * | 1/2013 | Yap | ......................... | H01R 13/72 439/501 |
| 2014/0308995 A1 * | 10/2014 | Wu | ......................... | H02J 7/007 455/573 |
| 2016/0064993 A1 * | 3/2016 | Fetterman | ............. | H02J 7/0044 320/137 |
| 2016/0064995 A1 * | 3/2016 | Schwalbach | ............ | A47F 7/022 320/108 |
| 2016/0241077 A1 * | 8/2016 | Lee | ......................... | H02J 7/025 |
| 2016/0344241 A1 * | 11/2016 | Hong | ...................... | H02J 50/90 |
| 2017/0088392 A1 * | 3/2017 | Wang | ..................... | B65H 75/06 |
| 2019/0140479 A1 * | 5/2019 | Henry | .................... | G04G 17/06 |

* cited by examiner

*Primary Examiner* — Hung V Ngo
(74) *Attorney, Agent, or Firm* — Wayne Edward Ramage; Baker Donelson (57) ABSTRACT

A combination case or holder and stand with removable charger for a smart watch. The case includes a top hingedly attached to a bottom, the top with a recharging disk holder with a recharging cord or recharger located in the interior or bottom of the case. The smart watch is laid on top of the case, or the entire case may be inserted into the watch band and secured. The case also may be used with the top open, and the smart watch placed so the case functions as a recharging watch stand.

6 Claims, 9 Drawing Sheets

TRAVEL CASE AND STAND FOR SMART WATCH

This application claims benefit of and priority to U.S. Provisional Applications No. 62/302,522, filed Mar. 2, 2016, and No. 62/311,437, filed Mar. 22, 2016, Andrew B. Green, and is entitled to those filing dates for priority. The specifications, figures, and complete disclosure of U.S. Provisional Applications Nos. 62/302,522 and 62/311,437 are incorporated herein in their entireties by specific reference for all purposes.

FIELD OF INVENTION

This invention relates generally to a combination case or holder and stand with removable charger for a smart watch.

BACKGROUND OF THE INVENTION

The proliferation of portable electronic devices and tablet computing devices is well known. Each successive iteration or generation provides increasingly greater features and capabilities, typically through a variety of user-friendly, content-specification applications (or "apps"). One relatively market segment that has shown exemplary growth is the "smart watch," such as the Apple Watch.

While smart watches typically are worn on the user's wrist, and thus are convenient for travel, current power consumption for these devices requires frequently (i.e., daily) charging. A travelling user thus must be sure to take a recharging unit with a cord and charging disk, appropriate USB adapters, and other accessors (such as changeable watch bands). These accessories are often forgotten, or if packed, can be easily damaged or lost.

Accordingly, what is needed is a convenient means of storing smart watch accessories that will protect the accessories while allowing full functionality, display and recharge of the smart watch with an aesthetically pleasing and protective appearance.

SUMMARY OF THE INVENTION

In various exemplary embodiments, the present invention comprises an elongated case with the top hingedly attached to the bottom along one side. In one embodiment, the case is similar in form to a clamshell style case. A clasp (magnetic, mechanical, or similar) along the opposite side may be used to securely close the case The inside of the top comprises a recharging disk holder, adapted to securely, but removably, hold a recharging disk for a smart watch. In one embodiment, the surface of the top above the charging disk holder is thin, or comprises appropriate material to allow the charging disk to operate with the watch placed on top of the case.

In an alternative embodiment, the holder comprises a hole adapted to receive and hold the charging disk. The hole is sealed with a plug when the disk is not in place. The plug may be removed by pulling on a tab on one side, whereupon the plug hingedly swings open, and the tab can be secured to a post or rod, or the plug inserted into or onto a hole or cavity or other holder, such as a cylindrical holdera, on the inside top, which holds the plug securely in place when the recharging disk in place.

The plug may be hingedly attached to or near the outer rim or circumference of the recharging disk holder or to the cylindrical holder. In several embodiments, the outer rim or circumference comprises a slot or opening adapted to receive the hinge strap of the plug, thereby allowing the hinge strap to lie flat when the plug is in place in the recharging disk holder hole.

The recharging disk holder comprises a cord channel, adapted to receive the recharging cord when placed in the holder and direct the cord along the inside back of the case (i.e., along the hinged side), to a recharging cord holder in the bottom of the case. In one embodiment, the recharging cord holder comprises one or more brackets extending up from the bottom, around which the recharging cord is wrapped.

The brackets of the recharging cord holder may be located at the ends of the bottom, thereby providing a space or one or more compartments in the center of the bracket(s) or between the brackets. These compartments may be used to securely hold a USB power plug/charging unit, a foreign power supply converter (e.g., a UK USB adapter, as shown), and extra watch bands (e.g., sport bands, formal bands, work bands). Other accessories may be stored in the case, and in several embodiments, the case is sized to store the smart watch as well as all accessories.

For recharging, the USB power plug/charging unit is removed and plugged into a power outlet or power supply, with the an appropriate length of recharging cord unreeled from the brackets or holder. The recharging cord may be placed or run through in a slot located at one or both ends (or sides) of the case, so that the recharging function can take place while the case is closed. The smart watch is placed over the outside top of the case at the appropriate spot for recharging by the recharging disk, which has been placed in the holder. An indentation or mark may be placed on the top to indicate proper placement of the smart watch if the disk holder does not comprise a hole.

The smart watch may be simply laid on top of the case, or the case may be inserted into the watch band and secured. In several exemplary embodiments, the top may be hinged open (and held open by springs or appropriate hinge mechanism as known in the art), and the watch placed so that the case functions as a recharging watch stand (i.e., visible on a bed stand). The alarm function of the watch can be used, so the watch and case in this configuration act as a portable, recharging traveling alarm.

BRIEF DESCRIPTION OF THE DRAWINGS

FIG. 4 shows a perspective view of the device of FIG. 1 with the recharging disk plugged in.

FIG. 5 shows another perspective view of the device of FIG. 1 with the recharging disk plugged in.

DETAILED DESCRIPTION OF EXEMPLARY EMBODIMENTS

In various exemplary embodiments, as described herein, and as seen in FIGS. 1-5, the present invention comprises an elongated case with a top 2 and a bottom 4, with the top hingedly 6 attached to the bottom along one side. In one embodiment, the case is similar in form to a clamshell style case. A clasp 8 (magnetic, mechanical, or similar) along the opposite side may be used to securely close the case As seen in FIGS. 1-4, the ends and edges of the case may be rounded or smoothed. The top and bottom may be rigid or semi-rigid, and made of a material with a variety of finishes.

The inside of the top comprises a recharging disk holder 20, adapted to securely, but removably, hold a recharging disk 30 for the smart watch. In one embodiment, the surface of the top above the charging disk holder is thin, or comprises appropriate material to allow the charging disk to operate with the watch placed on top of the case. In an alternative embodiment, the holder comprises a hole adapted to receive and hold the charging disk. The hole is sealed with a plug 26 when the disk is not in place. The plug may be removed by pulling on a tab on one side, whereupon the plug hingedly swings open, and the tab can be secured to a post or rod 28, or the plug inserted into or onto a hole or cavity or other holder, such as a cylindrical holder 28a, on the inside top, which holds the plug securely in place when the recharging disk in place.

Figure 1:
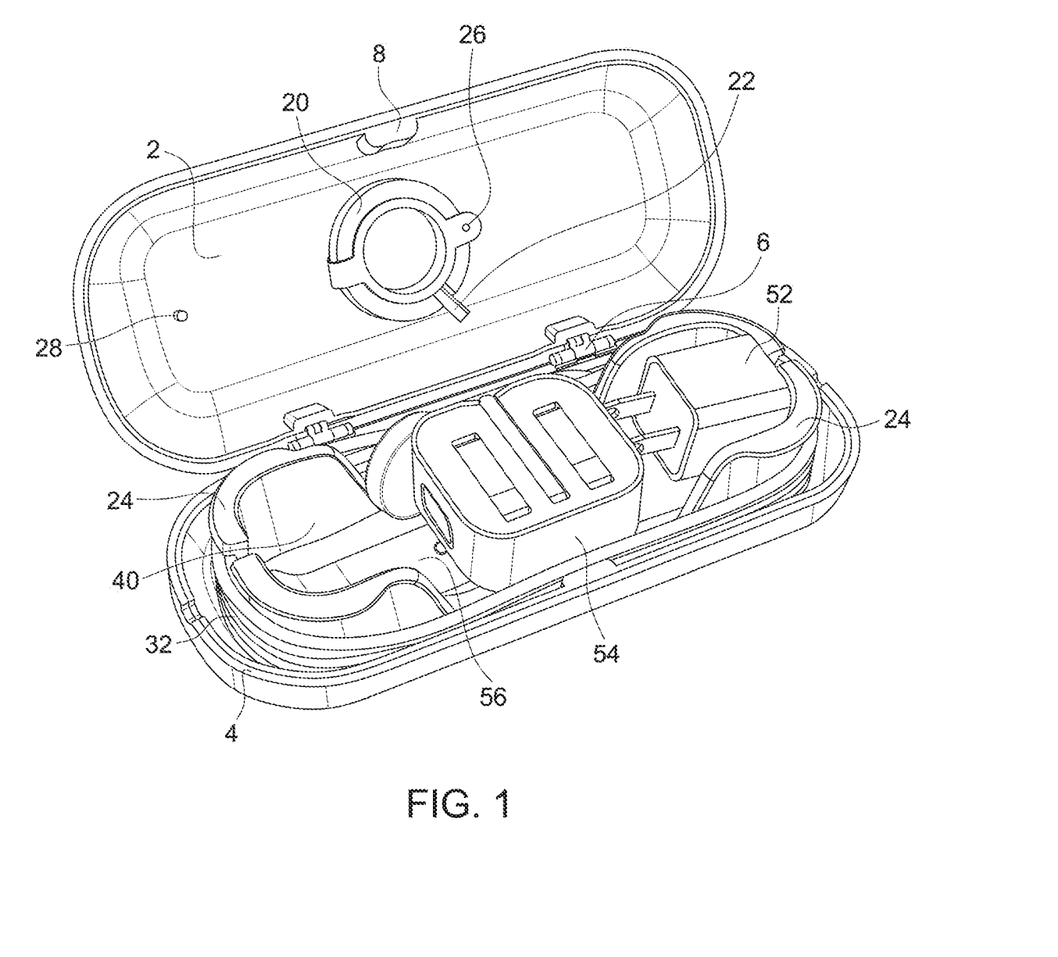
FIG. 1 shows a perspective view of an open device in accordance with an exemplary embodiment of the present invention.
Figure 2:
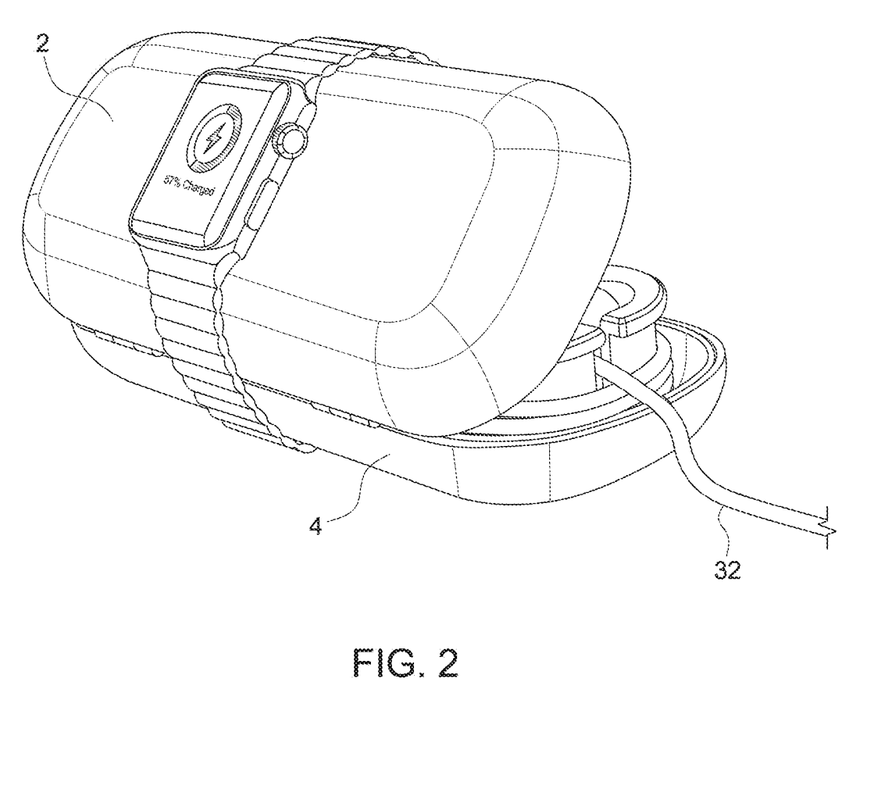
FIG. 2 shows another perspective view of the device of FIG. 1 in watch stand configuration.

The plug 26 may be hingedly attached to or near the outer rim or circumference 36 of the recharging disk holder, as seen in FIG. 1, or to the cylindrical holder, as seen in FIGS. 6-9. In several embodiments, as seen in FIGS. 6-9, the outer rim or circumference 36 comprises a slot or opening 38 adapted to receive the hinge strap 39 of the plug 26, thereby allowing the hinge strap to lie flat when the plug is in place in the recharging disk holder hole.

The recharging disk holder comprises a cord channel 22, adapted to receive the recharging cord 32 when placed in the holder and direct the cord along the inside back of the case (i.e., along the hinged side), to a recharging cord holder 24 in the bottom of the case. In one embodiment, the recharging cord holder comprises one or more brackets extending up from the bottom, around which the recharging cord 32 is wrapped.

The brackets of the recharging cord holder may be located at the ends of the bottom, thereby providing a space or one or more compartments 40 in the center of the bracket(s) or between the brackets. These compartments may be used to securely hold a USB power plug/charging unit 52, a foreign power supply converter (e.g., a UK USB adapter, as shown) 54, and extra watch bands 56 (e.g., sport bands, formal bands, work bands). Other accessories may be stored in the case, and in several embodiments, the case is sized to store the smart watch as well as all accessories.

For recharging, the USB power plug/charging unit is removed and plugged into a power outlet or power supply, with the an appropriate length of recharging cord unreeled from the brackets or holder. The recharging cord may be placed or run through in a slot 34 located at one or both ends (or sides) of the case, so that the recharging function can take place while the case is closed. The smart watch is placed over the outside top of the case at the appropriate spot for recharging by the recharging disk, which has been placed in the holder. An indentation or mark may be placed on the top to indicate proper placement of the smart watch if the disk holder does not comprise a hole.

Figure 3:
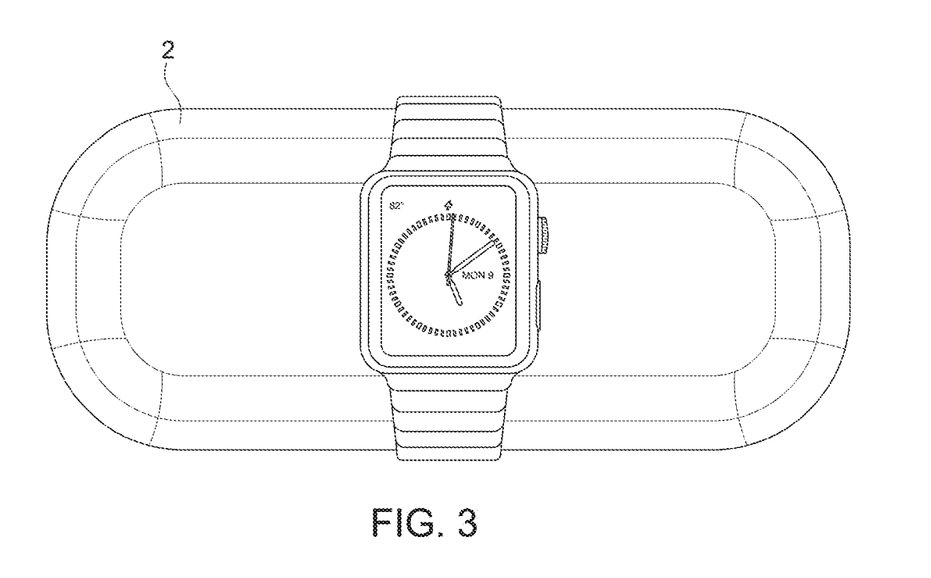
FIG. 3 shows a top view of the device of FIG. 1 in closed position.
Figure 4:
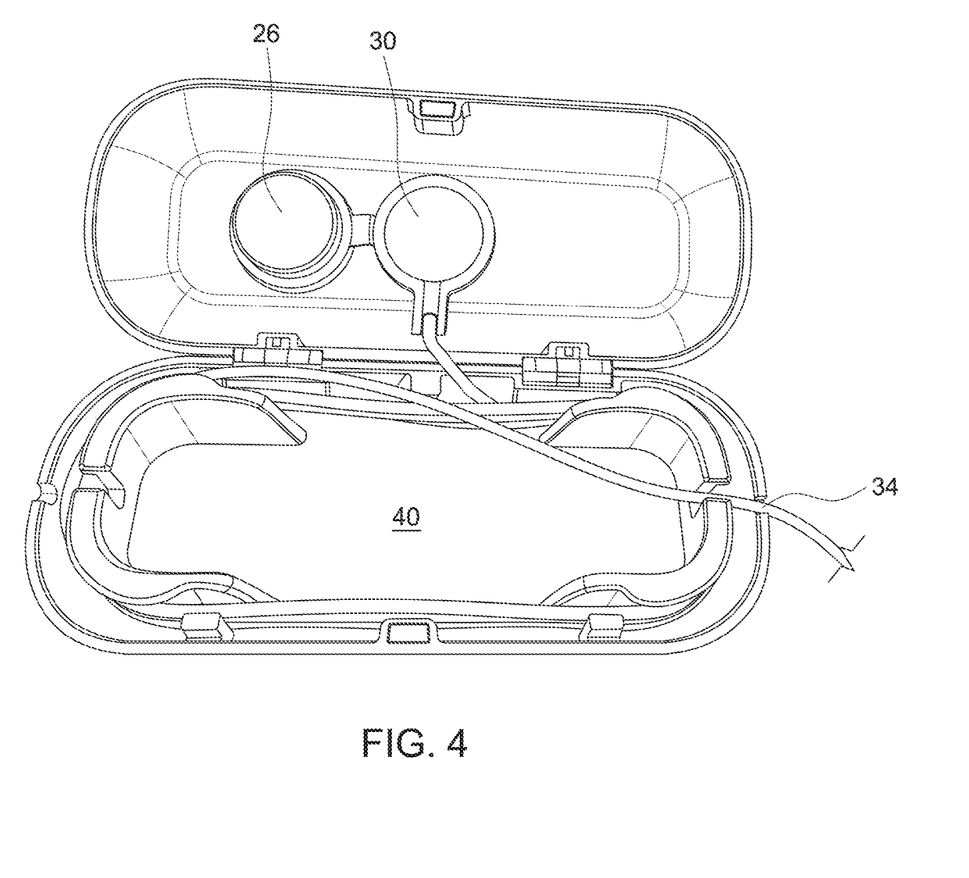
Figure 5:
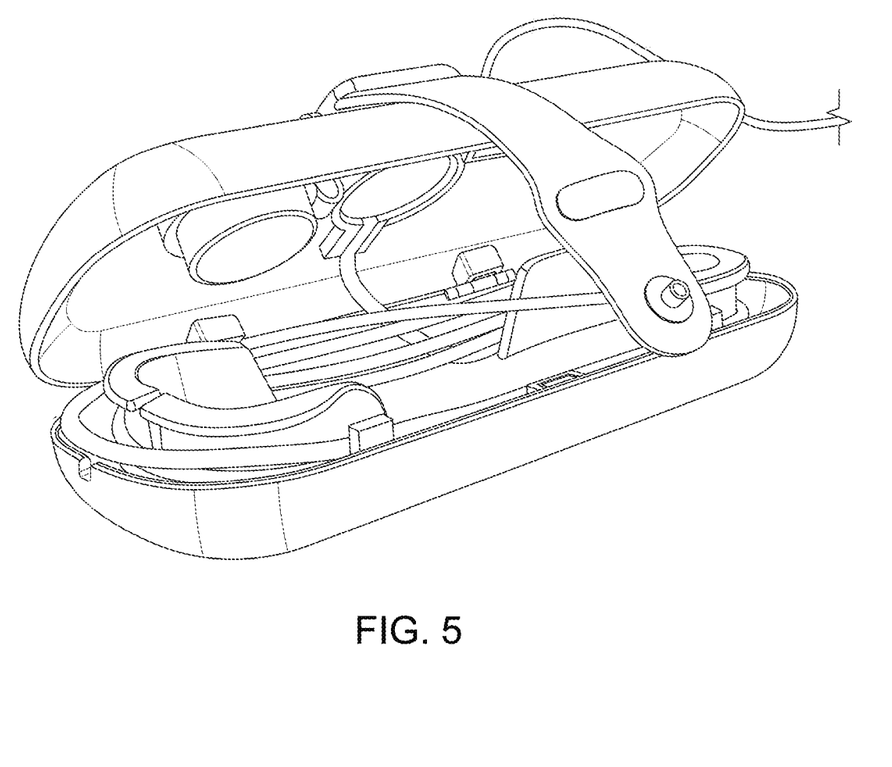
Figure 6:
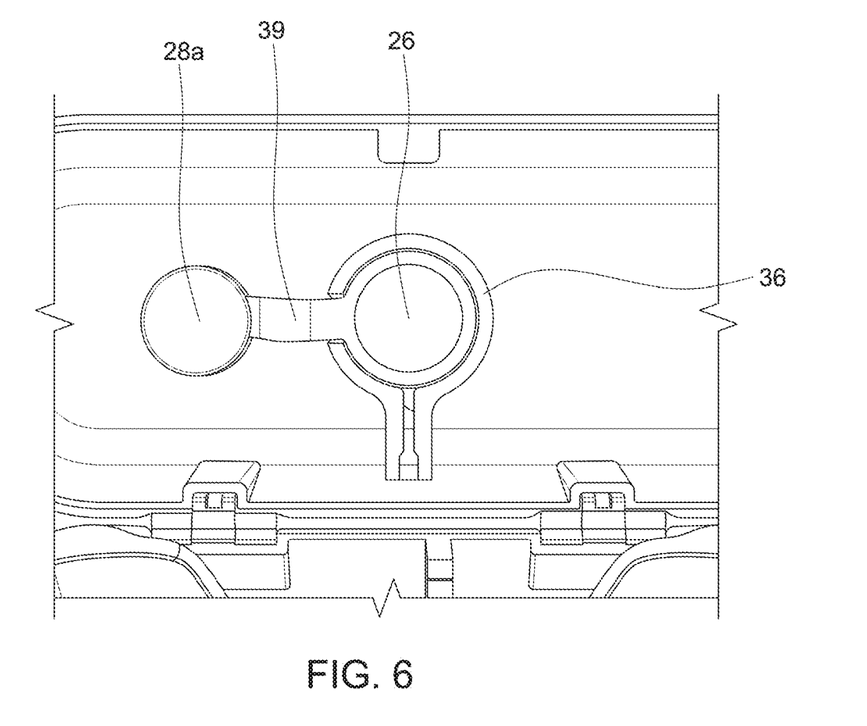
FIG. 6 shows a close up view of a plug in place in the recharging disk holder.
Figure 7:
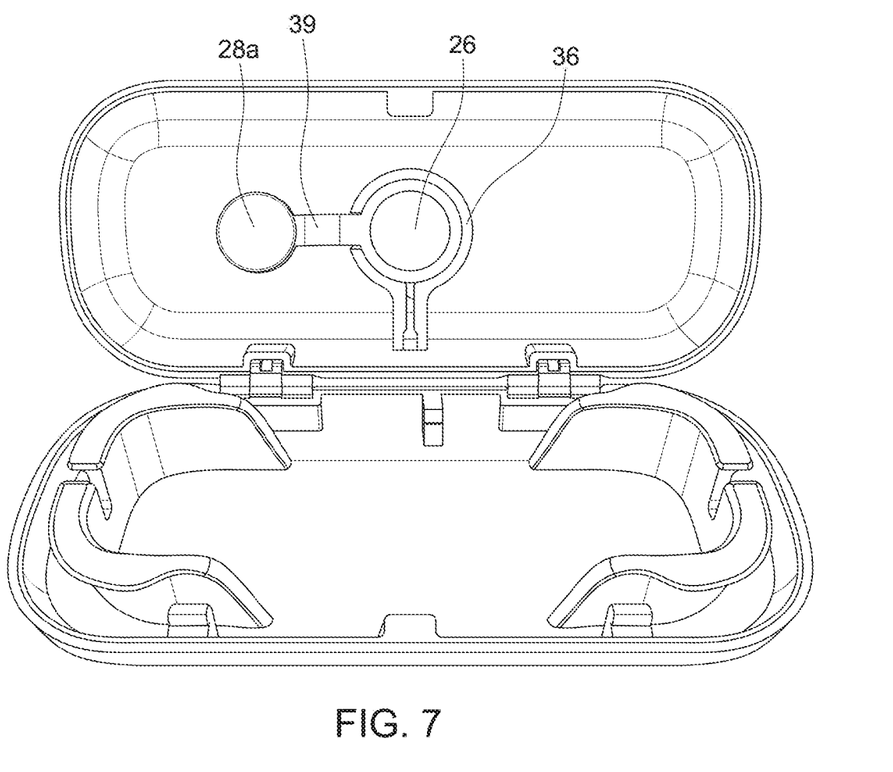
FIG. 7 shows a perspective view of the device of FIG. 6.
Figure 8:
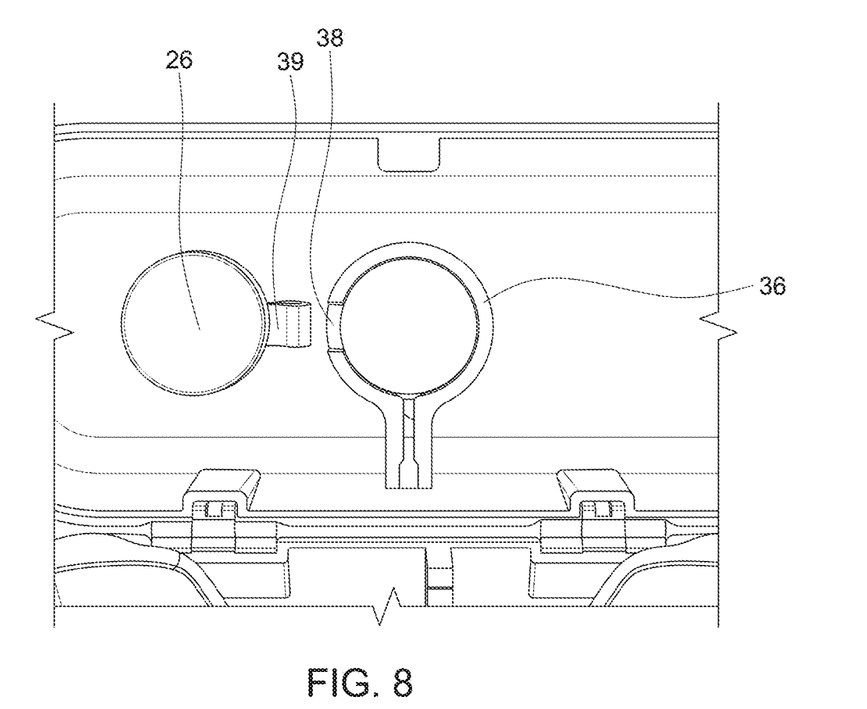
FIG. 8 shows a close up view of the plug of FIG. 6 removed from the recharging disk holder and inserted over the holding cylinder.
Figure 9:
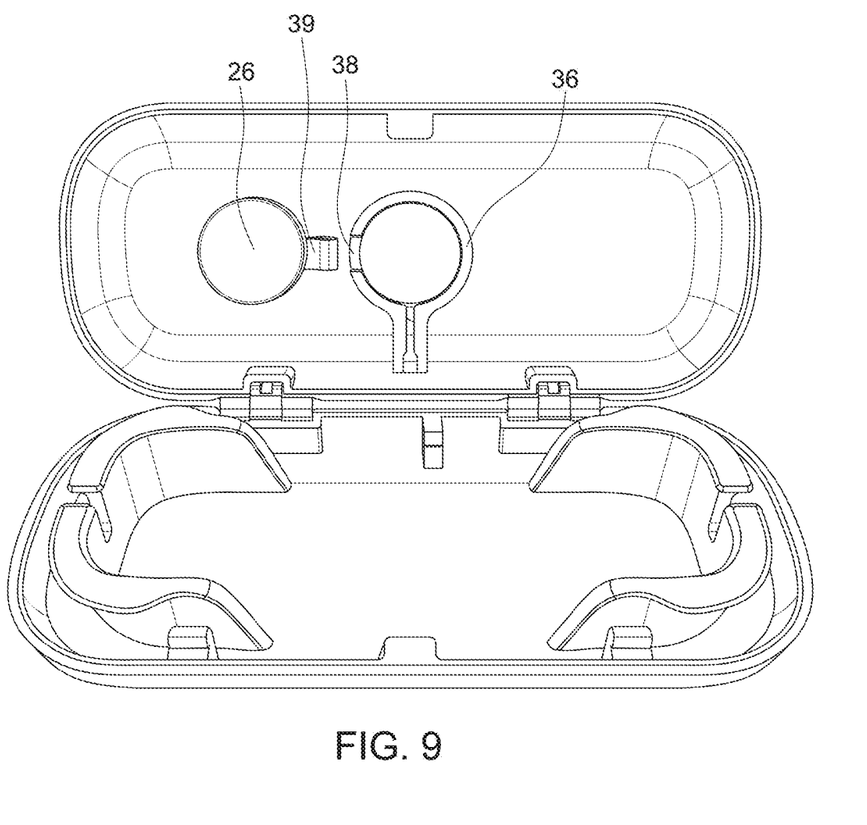
FIG. 9 shows a perspective view of the device of FIG. 8.

The smart watch may be simply laid on top of the case, or the case may be inserted into the watch band and secured, as seen in FIGS. 3 and 4. In several exemplary embodiments, the top may be hinged open (and held open by springs or appropriate hinge mechanism as known in the art), and the watch placed so that the case functions as a recharging watch stand (i.e., visible on a bed stand). The alarm function of the watch can be used, so the watch and case in this configuration act as a portable, recharging traveling alarm.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A smart watch case, comprising:
   a top hingedly attached to a bottom, the top with an exterior side and an interior side, wherein the top and bottom together form a clamshell case with an interior, and hingedly open to allow access to one or more storage compartments in the interior;
   a recharging disk holder on the interior side of the top, configured to securely hold a smart watch recharging disk;
   a hole in the top of the case above the recharging disk holder; and
   a removable plug configured to seal the hole when a recharging disk is not in place in the recharging disk holder, wherein the plug is removed from the hole when the recharging disk is in place in the recharging disk holder.

2. The case of claim 1, further comprising:
   a recharging cord holder in the bottom of the case; and
   a recharging cord channel on the interior side of the top, adapted to hold a recharging cord extending from recharging disk holder to the recharging cord holder.

3. The case of claim 2, wherein the recharging cold holder comprises a pair of brackets with one or more compartments in the bottom therebetween.

4. The case of claim 3, wherein said one or more compartments comprises a charging unit compartment.

5. The case of claim 1, wherein the top and bottom are elongated.

6. The case of claim 1, comprising three use configurations when a recharging disk has been inserted into the recharging disk holder:
   a first use configuration where the case is closed, and a smart watch is laid upon the top of the case with the smart watch positioned directly above the recharging disk holder;
   a second use configuration where the case is closed and inserted into a watch band of a smart watch with the smart watch positioned directly above the recharging disk holder;
   a third use configuration where the case is open with the top at an angle to the bottom, and a smart watch is laid upon the angled top with the smart watch positioned directly above the recharging disk holder.

\* \* \* \* \*